United States Patent
Wittman

(10) Patent No.: US 6,940,970 B2
(45) Date of Patent: Sep. 6, 2005

(54) RING BOOST CIRCUIT TO EXTEND RINGING RANGE OF TELEPHONE SLICS

(75) Inventor: Brian Albert Wittman, Indianapolis, NJ (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 351 days.

(21) Appl. No.: 10/211,728

(22) Filed: Aug. 2, 2002

(65) Prior Publication Data

US 2003/0068031 A1 Apr. 10, 2003

Related U.S. Application Data

(60) Provisional application No. 60/327,690, filed on Oct. 5, 2001.

(51) Int. Cl.[7] ................................................ H04M 1/00
(52) U.S. Cl. .................. 379/401; 379/382; 379/395.01; 379/413
(58) Field of Search ............................ 379/395.01, 372, 379/373.01, 386, 401, 413, 382, 387.01, 395, 413.01, 418, 422

(56) References Cited

U.S. PATENT DOCUMENTS

| | | | |
|---|---|---|---|
| 4,578,541 A | * | 3/1986 | Dodds .................... 379/373.01 |
| 5,086,454 A | * | 2/1992 | Hirzel ...................... 379/93.36 |
| 5,764,755 A | * | 6/1998 | Chen ...................... 379/413.01 |
| 6,160,884 A | * | 12/2000 | Davis .................... 379/373.01 |
| 6,326,852 B1 | * | 12/2001 | Wakayama .................. 331/17 |
| 6,377,667 B1 | * | 4/2002 | Poulis et al. ............. 379/93.36 |

* cited by examiner

*Primary Examiner*—Binh Tieu
*Assistant Examiner*—Tuan Pham
(74) *Attorney, Agent, or Firm*—Joseph S. Tripoli; Robert B. Levy; Joseph J. Kolodka

(57) ABSTRACT

A ring boost circuit has a first switching device coupled to a ring node. The first switching device is responsive to a ring operation. A charge pump is connected to the ring node, and the charge pump provides a voltage offset to enhance a differential voltage between the ring node and a tip node when the first switching device is activated during the ring operation.

18 Claims, 11 Drawing Sheets

US 6,940,970 B2

RING BOOST CIRCUIT TO EXTEND RINGING RANGE OF TELEPHONE SLICS

RELATED APPLICATION DATA

The present disclosure claims priority to U.S. provisional application Ser. No. 60/327,690 filed on Oct. 5, 2001, which is hereby incorporated by reference.

FIELD OF THE INVENTION

The present invention generally relates to network communication systems and, more particularly, to a method and system which enables a low-cost telephone SLIC (subscriber line interface circuit) to generate ringing with a DC offset that more accurately mimics the operation of a telephone company tip-ring interface.

BACKGROUND OF THE INVENTION

Ringing produced by a telephone company usually has the 20 Hz ringing signal riding on a direct current (DC) level of approximately 48V. Low-cost subscriber line interface circuits (SLICs) used in voice over Internet protocol (VoIP) and other products cannot provide this ringing signal because such a ringing signal requires too much voltage. To provide a high voltage amplitude requires a much more expensive solution.

One expensive solution is to use a SLIC capable of handling a much higher battery voltage, and increasing the battery voltage. This adds cost to the SLIC, power supply, and increases power dissipation. Another solution is to use separate ICs for the SLIC and ringing functions, and switch the SLICs with relays. This also adds significant cost.

Certain phones and answering machines depend on the DC offset as well as the ring signal amplitude to respond. These phones do not ring properly when driven by the ring signal generated by these inexpensive SLIC integrated circuits (ICs). The ring signal in these devices is typically a 140 VP-P trapezoidal or sinusoidal waveform with a 0 VDC offset.

Therefore, a need exists for a system and method, which permits a DC offset to be added for a very small incremental cost, and permits low-cost SLICs to drive telephone products.

SUMMARY OF THE INVENTION

The present invention employs a charge pump circuit in combination with switches or current limiting devices to generate a DC offset, which is added to a ringing signal. Advantageously, the charge pump is powered by the ring signal itself.

In one embodiment, a ring boost circuit has a first switching device coupled to a ring node. The first switching device is responsive to a ring operation. A charge pump is connected to the ring node, and the charge pump provides a voltage offset to enhance a differential voltage between the ring node and a tip node when the first switching device is activated during the ring operation.

Another ring boost circuit includes a tip node and a ring output node. A first switch is coupled to the ring node and is responsive to a ring operation. A charge pump is connected between the ring node and the first switch. The charge pump provides a voltage offset to enhance a differential voltage between the ring node and the tip node when the first switch device is closed to connect the ring output node to the charge pump during the ring operation. A second switch connects the tip node to the charge pump during the ring operation.

Yet another ring boost circuit includes a current limiting device coupled to a tip node to decouple signals other than signals associated with a ring operation, and a charge pump connected to a ring node and the current limiting device. The charge pump provides a voltage offset to enhance a differential voltage between the ring node and the tip node when activation current is received from the tip node during the ring operation.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides a system and method which enables a low-cost telephone SLIC (subscriber line interface circuit), for example, in a voice over Internet protocol (VoIP) unit, to generate ringing with a direct current (DC) offset voltage that more accurately mimics the operation of a telephone company's tip-ring interface. The VoIP unit preferably includes a telephone SLIC (subscriber line interface circuit) to generate a tip/ring interface capable of interfacing to conventional telephones. During ringing, a charge pump circuit provides a DC offset that is added to the ringing signal. The charge pump is powered by the ring signal itself.

It is to be understood that the present invention is described in terms of a VoIP system; however, the present invention is much broader and may include any telephone system, which needs or uses a SLIC to provide ringing of a telephone product. In addition, the present invention is applicable to any system capable of simulating a ringing signal for a telephone, set top boxes, computers, satellite boxes, or any other network or system employing a ring signal.

It should be understood that the FIGS. show illustrative magnitudes for components. These values are employed to demonstrate examples of the present invention and should not be construed as limiting. One skilled in that art would understand the types of components and their magnitude may be adjusted within the spirit and scope of the present invention.

Figure 1:
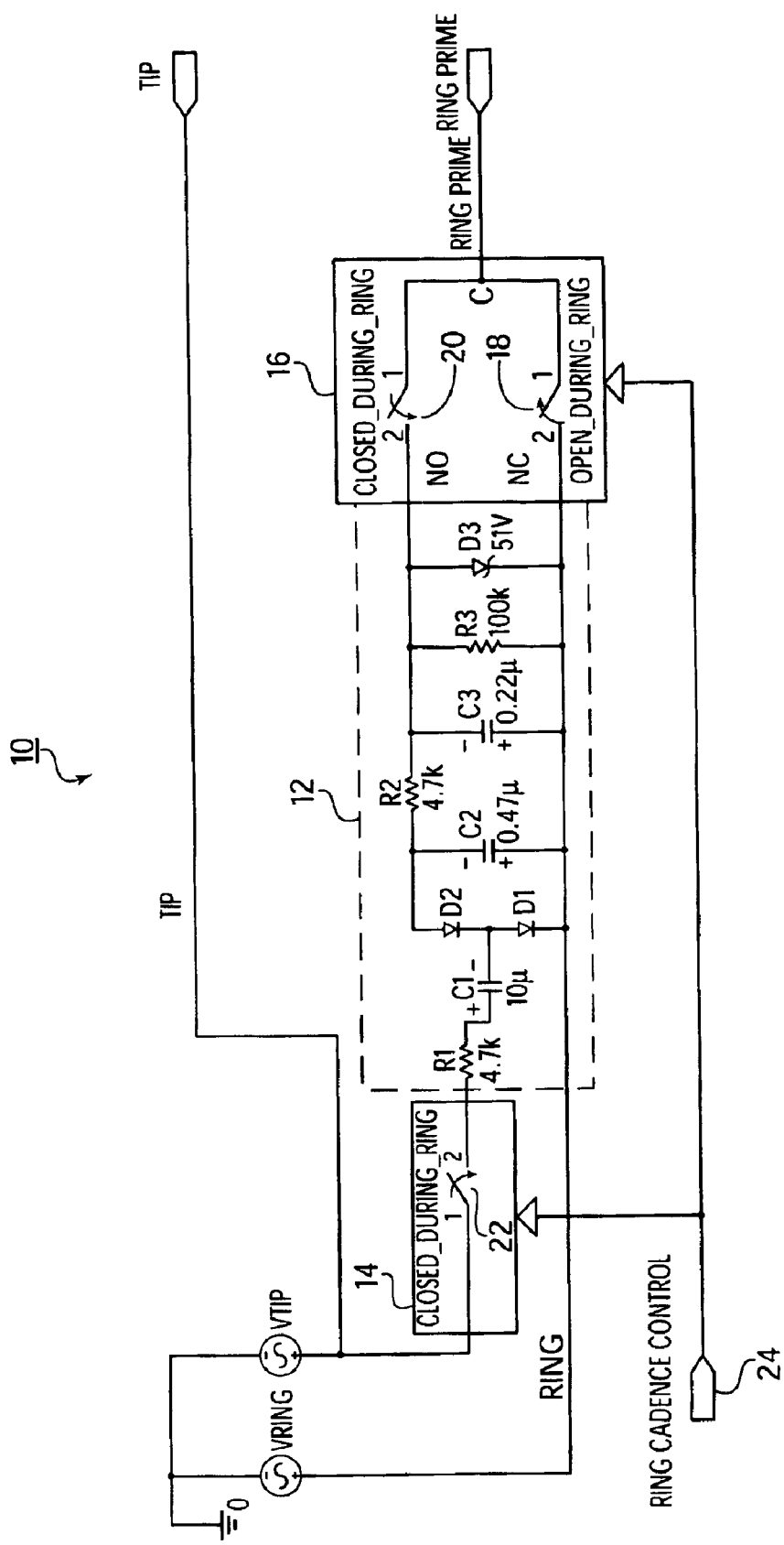
FIG. 1 is a schematic diagram of a ring boost circuit in accordance with one embodiment of the present invention.

Referring now in specific detail to the drawings in which like reference numerals identify similar or identical elements throughout the several views, and initially to FIG. 1, a ring boost circuit 10 is shown in accordance with one embodiment of the present invention. Ring boost circuit 10 includes a charge pump circuit 12 in combination with switches 14 and 16 to generate a direct current (DC) offset that is added to a ringing signal. Advantageously, the charge pump 12 is powered by the ring signal.

TIP and RING are the outputs from a telephone subscriber line interface circuit (SLIC, which is not shown). During an "on-hook" state (i.e., all connected phones are on-hook), TIP may normally be close to ground potential (0V) and RING may normally be about −50 VDC. During ringing, TIP and RING are opposing 20 Hz trapezoidal waveforms (or sinusoidal waveforms) that go from approximately 0V to −70 VDC. The resulting differential signal across TIP and RING is a 140 VP-P trapezoidal waveform. During an "off-hook" state (i.e., one or more phones are off hook), TIP is normally close to ground potential (0V) and RING is approximately −6 VDC. TIP and RING waveforms during ringing are illustratively shown in FIG. 2.

Figure 2:
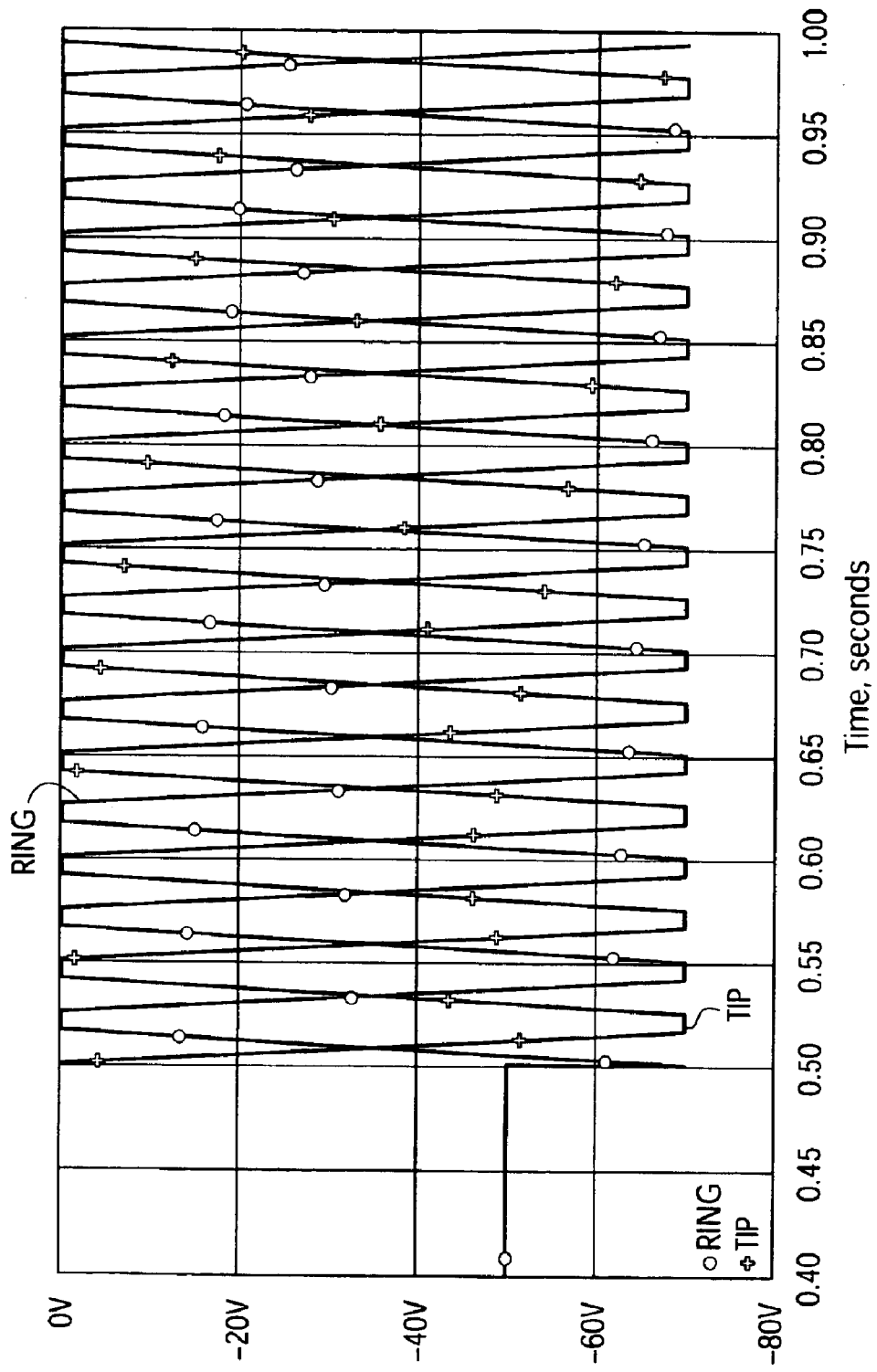
FIG. 2 is a diagram illustratively showing Tip and Ring signals during ringing for the circuit of FIG. 1.
Figure 3:
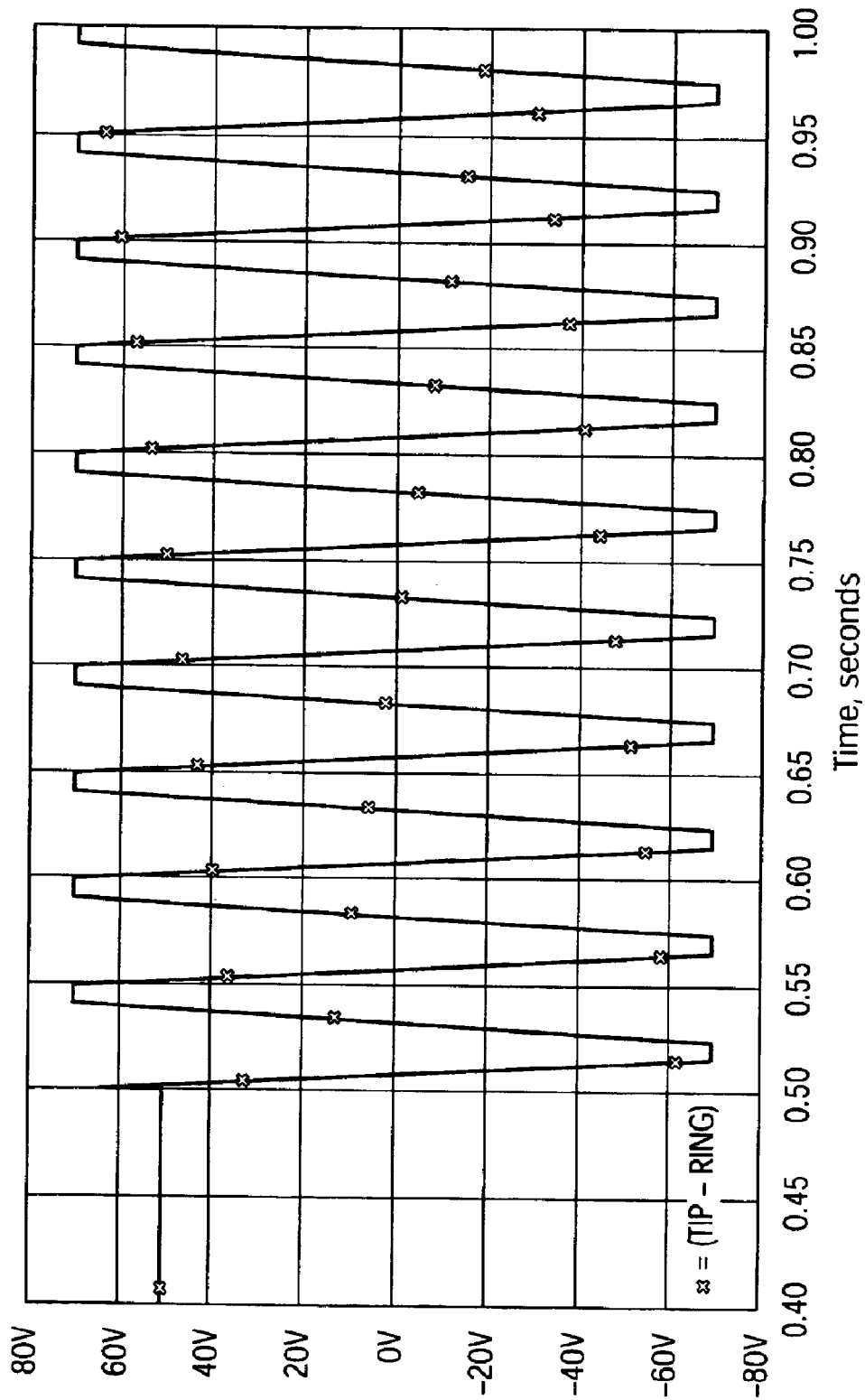
FIG. 3 is a diagram illustratively showing the voltage difference between the Tip and Ring signals during ringing for the circuit of FIG. 1.

Referring to FIG. 2, just prior to ringing, TIP is at about 0 VDC, and RING is at about −50 VDC. During ringing, both TIP and RING output 70 VP-P waveforms. In FIG. 3, the 140 VP-P differential waveform is illustratively shown for TIP-RING. In FIG. 3, during the on-hook state, there is a 50V DC level, but the DC level during ringing is effectively 0 VDC.

Figure 4:
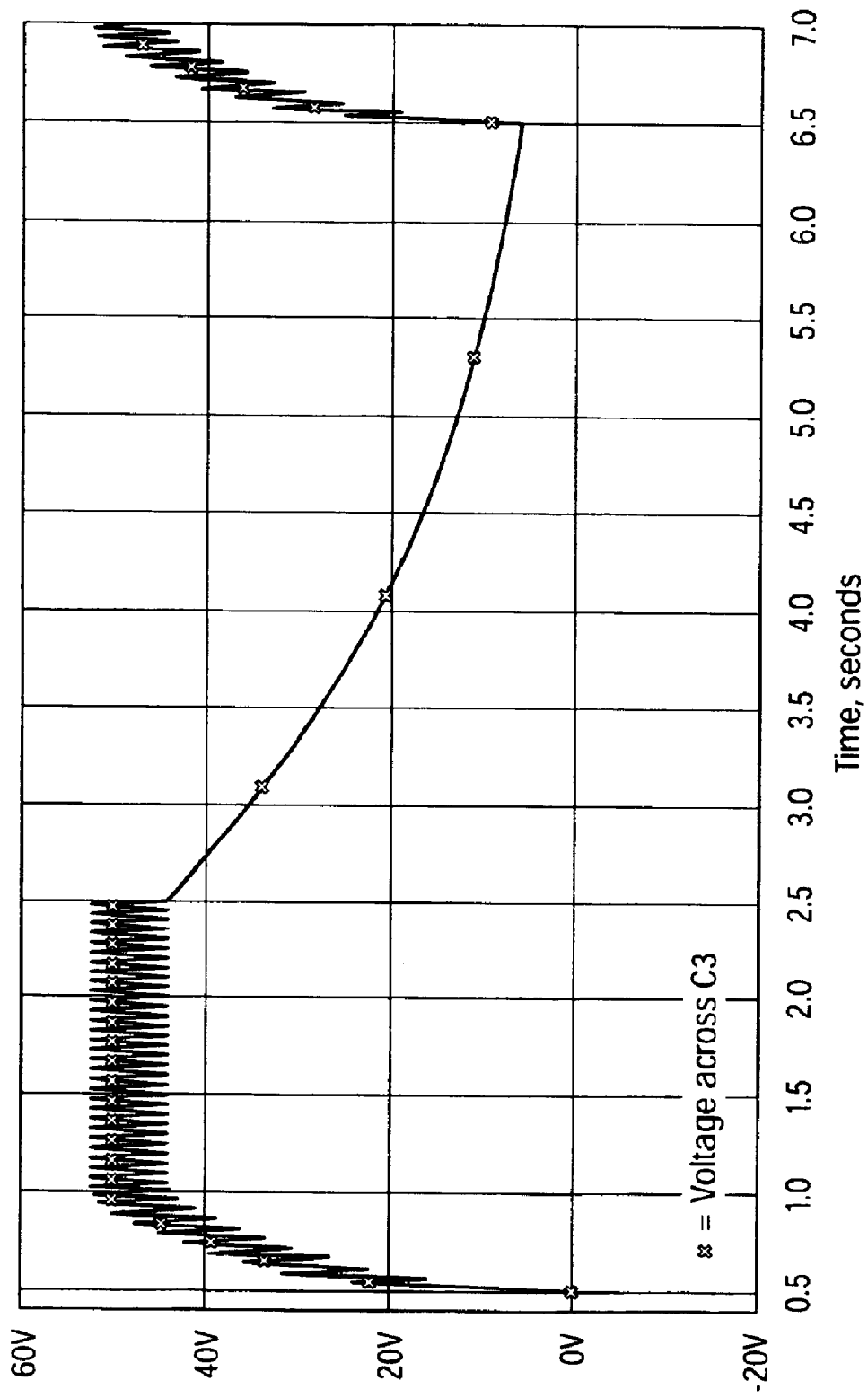
FIG. 4 is a diagram showing voltage across a charge capacitor of a charge pump during ringing and non-ringing operations in accordance with the present invention.

Returning to FIG. 1, charge pump 12 may be implemented in a plurality of different ways. One implementation, in accordance with the present invention, includes employing resistors R1, R2, R3, capacitors C1, C2, C3 and diodes D1 and D2. FIG. 1 shows illustrative magnitudes for these devices. These values may be adjusted and different values may be employed in accordance with the present invention. During ringing, the voltage on C3 would normally charge to about 70 volts, but is clamped by a zener diode D3 to, e.g., 51V. When not ringing, switches 22 and 20 are open and C3 discharges through R3 with, e.g., a 2.2 sec time constant. Other clamping voltages and time constants are also contemplated and may be adjusted as known to those skilled in the art. The voltage across C3 is illustratively shown in FIG. 4. The voltage charges to the voltage allowable by diode D3 during ringing.

Advantageously, switches 14 and 16 operate in such a way that the voltage across C3 is effectively added to RING during ringing. When not ringing, a first (or normally closed (NC)) switch 18 is closed and RING PRIME (or other output node) is connected to RING. During ringing the switch 18 opens and a second (or normally open (NO)) switch 20 closes. This connects C3 in series with RING so that the voltage at RING PRIME is RING plus the voltage across C3. At the same time, the voltage across C3 is increasing up to 51V, due to the operation of charge pump 12. A third switch 22 is needed to keep the charge pump circuit 12 from loading down touch-tone and audio signals during off-hook intervals. A ring cadence control signal 24 is employed to operate switches 14 and 16 coincident with the ringing waveforms on TIP and RING.

Simultaneous closure of both switches 20 and 18 should be prevented, especially at the end of a ring cycle. The reason is that if both switches 20 and 18 are closed, C3 will discharge rapidly through the switches. Only the switch resistance will limit the current, which could be quite high. This current may cause damage to the devices, which implement the switches, such as MOSFETs Q7 and Q8 in FIG. 7.

Figure 5:
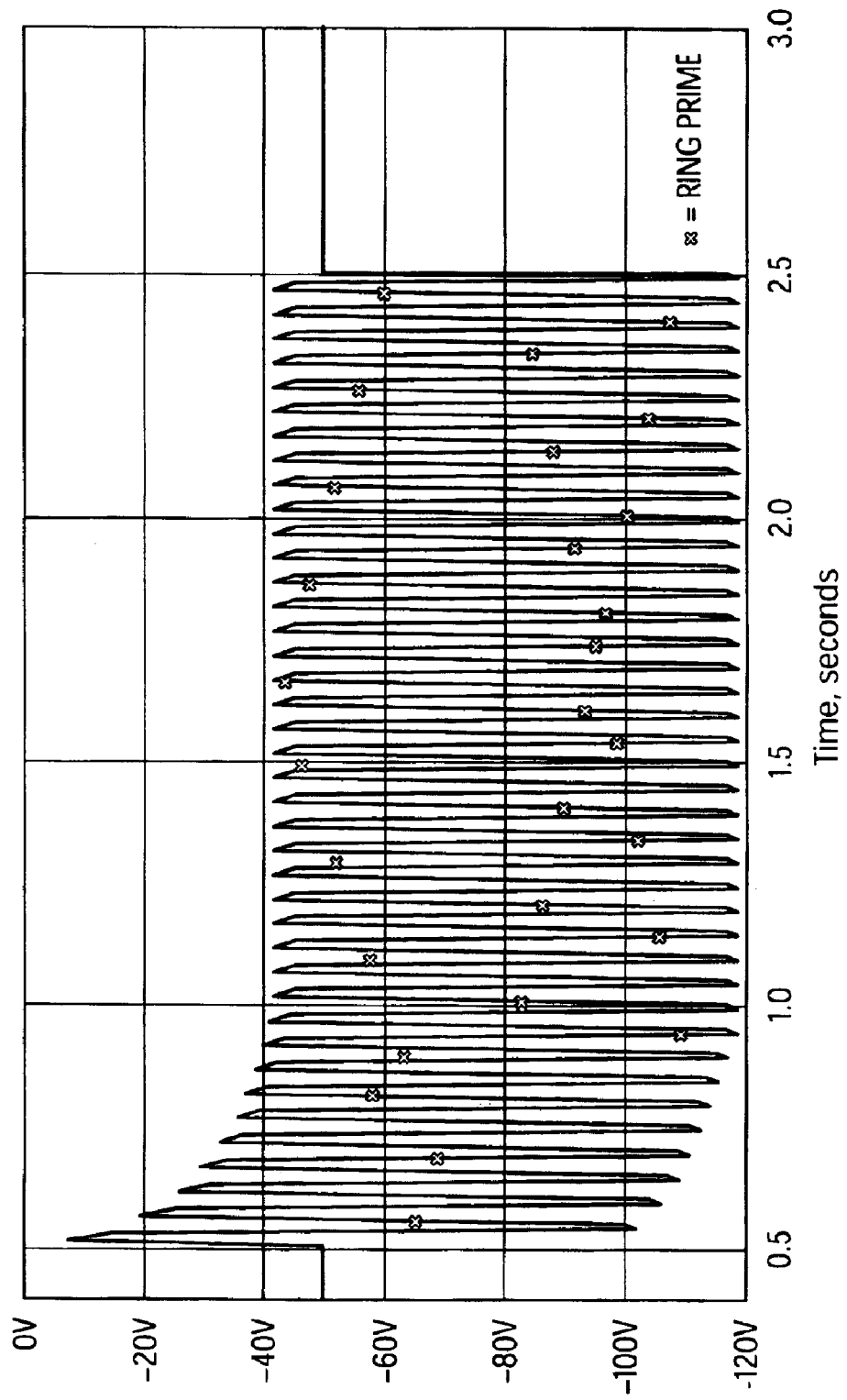
FIG. 5 is a diagram illustratively showing the voltage at RING PRIME for the circuit of FIG. 1.
Figure 6:
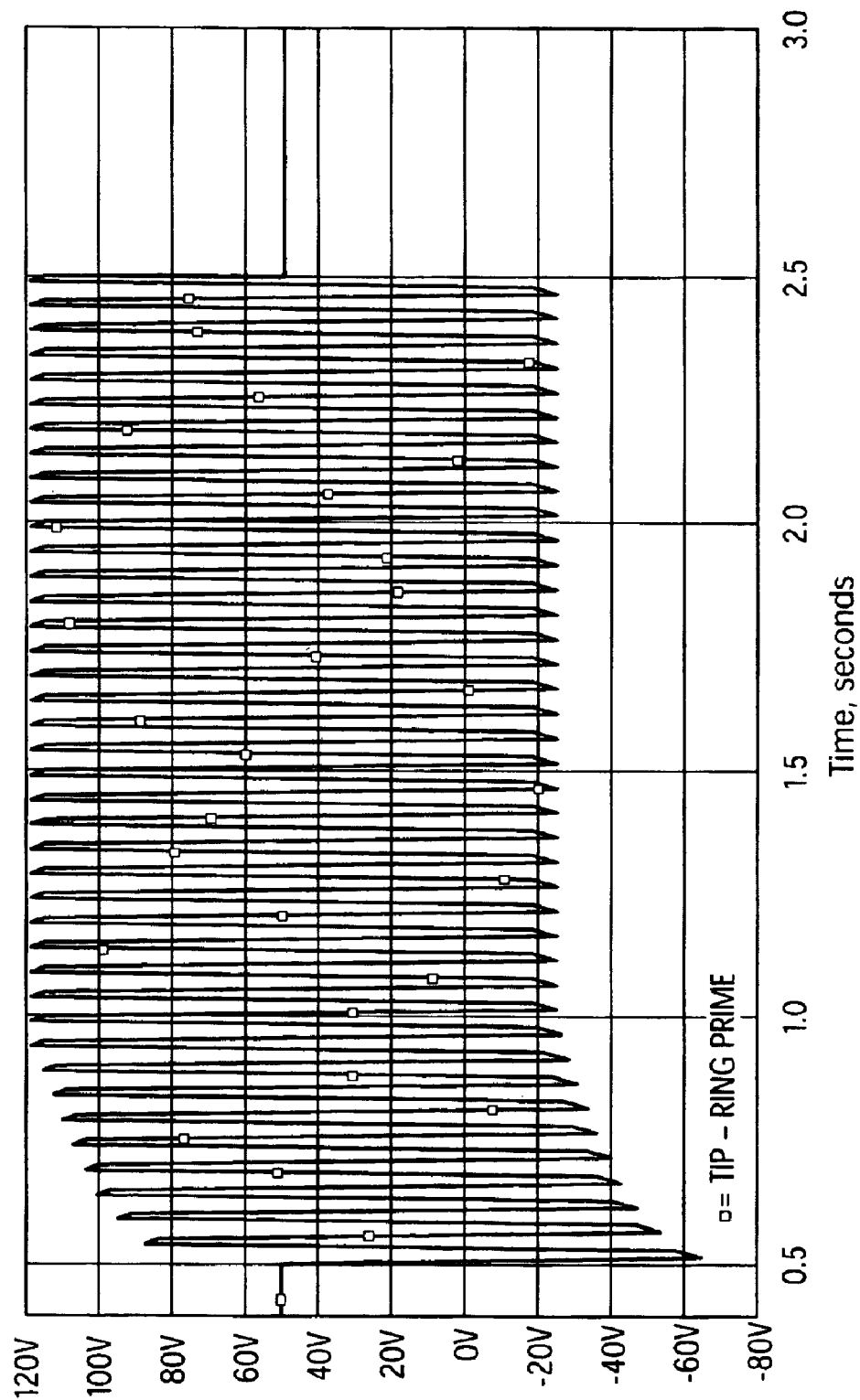
FIG. 6 is a diagram illustratively showing the voltage difference between the TIP and RING PRIME signals for the circuit of FIG. 1.

The waveform at RING PRIME is illustratively shown in FIG. 5, and the differential voltage TIP-RING PRIME is illustratively shown in FIG. 6.

Comparing FIGS. 3 and 6, after a few hundred milliseconds the DC offset voltage of the ringing increases from 0 V to about 50V and remains so until the end of ringing. The combined DC offset and AC ring amplitude are sufficient to ring even troublesome phones, obviating the need for a brute force approach which use voltages of 100 Volts or more to achieve ringing.

Figure 7:
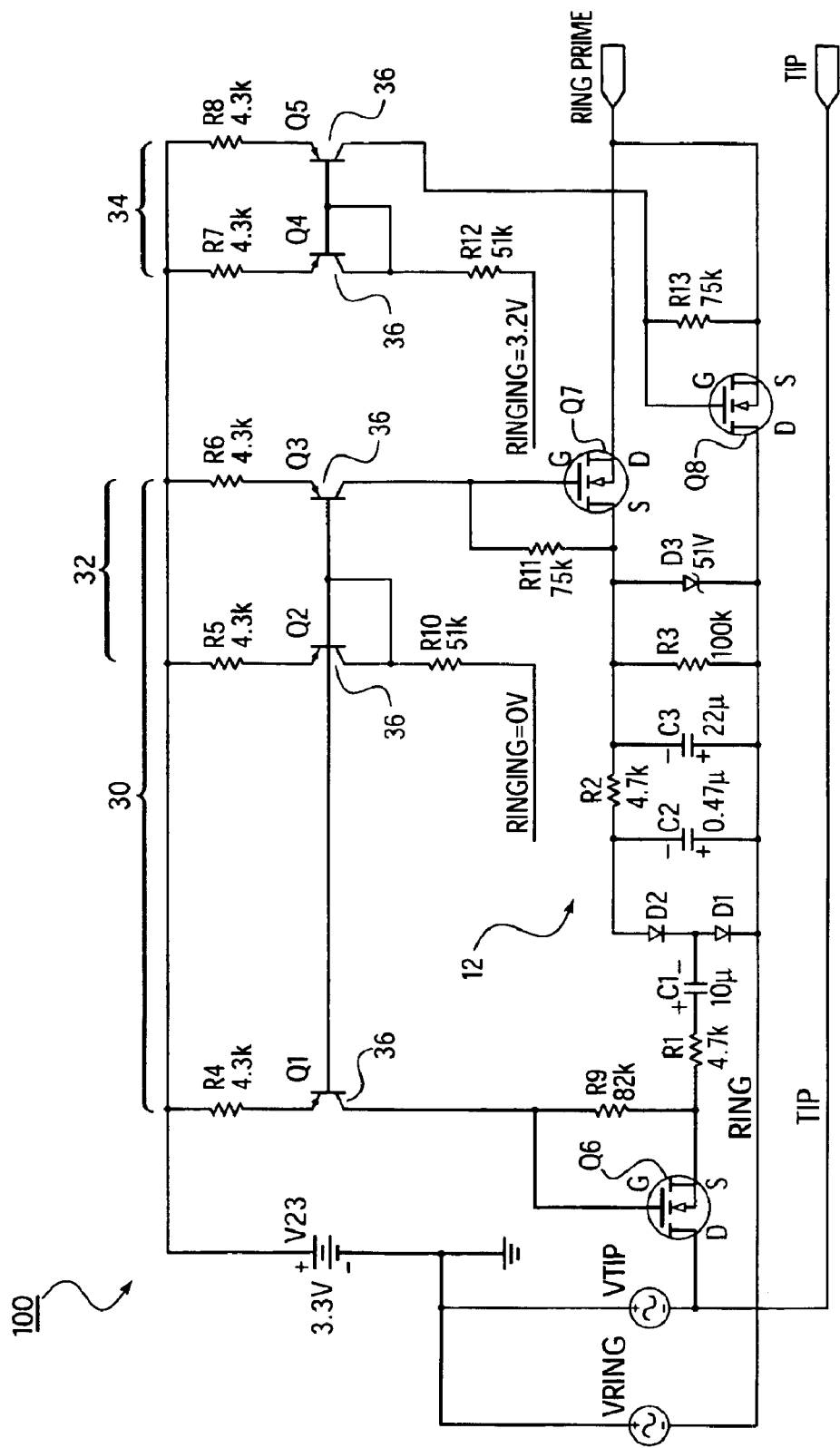
FIG. 7 is a schematic diagram of another ring boost circuit, which employs MOSFETs as switches, controlled by current mirrors in accordance with another embodiment of the present invention.

Referring to FIG. 7, another embodiment of the present invention is shown in accordance with the present invention. N-channel MOSFETs, Q6, Q7 and Q8 are employed to implement switches 22, 20 and 18, respectively, as described and shown in FIG. 1. These MOSFETs are respectively controlled by current mirrors 30, 32, and 34 implemented with high-voltage PNP transistors 36. The current mirrors 30, 32 and 34, in this embodiment, are illustratively designed to output 50 micro-amps which generate a gate voltage of about 3.75V for MOSFETs Q7 and Q8, and 3.1V for Q6. The current mirrors 30, 32 and 34 keep the MOSFET gate-source voltage relatively constant. A resistor R9 is sized (e.g., 62 kOhms instead of 75 kOhms for R11 and R13) to prevent transistor Q1 from saturating, which could reduce gate drive for Q6. Other implementations for the switches are possible including reed relays and solid-state relays. However, MOSFETs provide a cost effective solution. In fact, at current pricing, the circuit 200 for a single telephone line costs less than 35 cents. Component values are illustratively shown in FIG. 7. Other values may be used to provide effective functionality in accordance with the present invention.

Simultaneous closure of both MOSFET switches Q7 and Q8 should be prevented, especially at the end of a ring cycle. In the example described above, C3 will discharge rapidly through the switches if this happens. Only the switch resistance will limit the current. For example, if C3 is charged up to 50V, and the on resistance of each MOSFET Q7 and Q8 is 6 ohms, then the resulting current if both MOSFETs are on is 4.17A. This current exceeds the current rating of the MOSFETs Q7 and Q8 and may result in damage to one or both devices. A delay for switch activation may be implemented in hardware or software to prevent this from occurring. Specifically, implementing a small "dead time" during ring transitions in which both devices are off will prevent this situation from occurring. In alternative embodiments which utilize a reed relay or solid-state relay for switch 16, a "break before make" type switch should be used.

Figure 8:
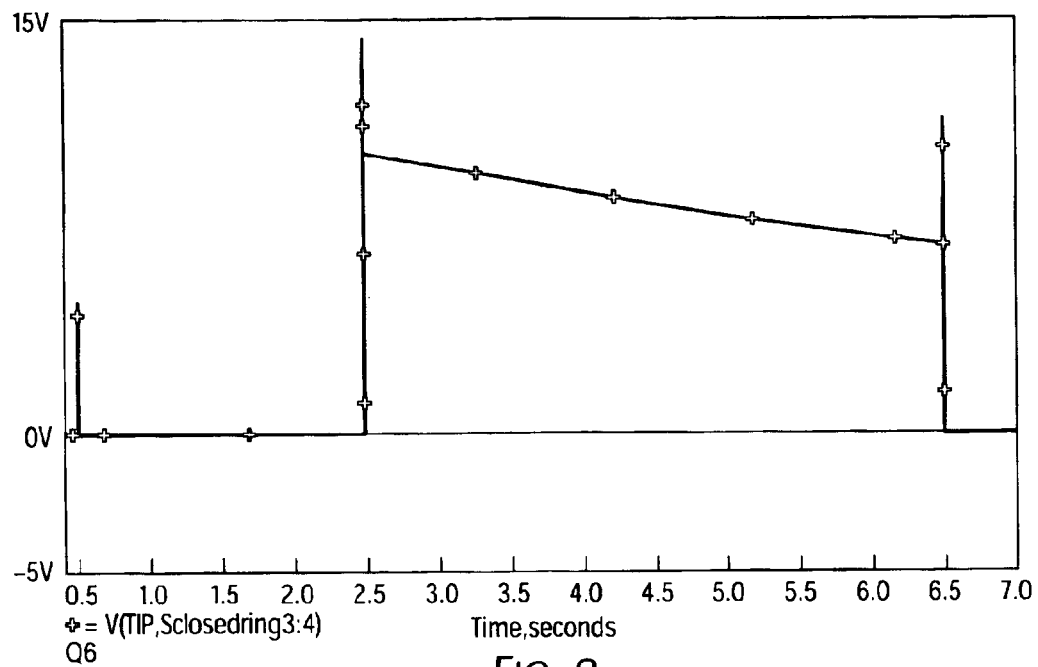
FIGS. 8–10 are diagrams illustratively showing the voltages across three switches during a ringing operation for the circuits of FIG. 7 in accordance with the present invention.
Figure 9:
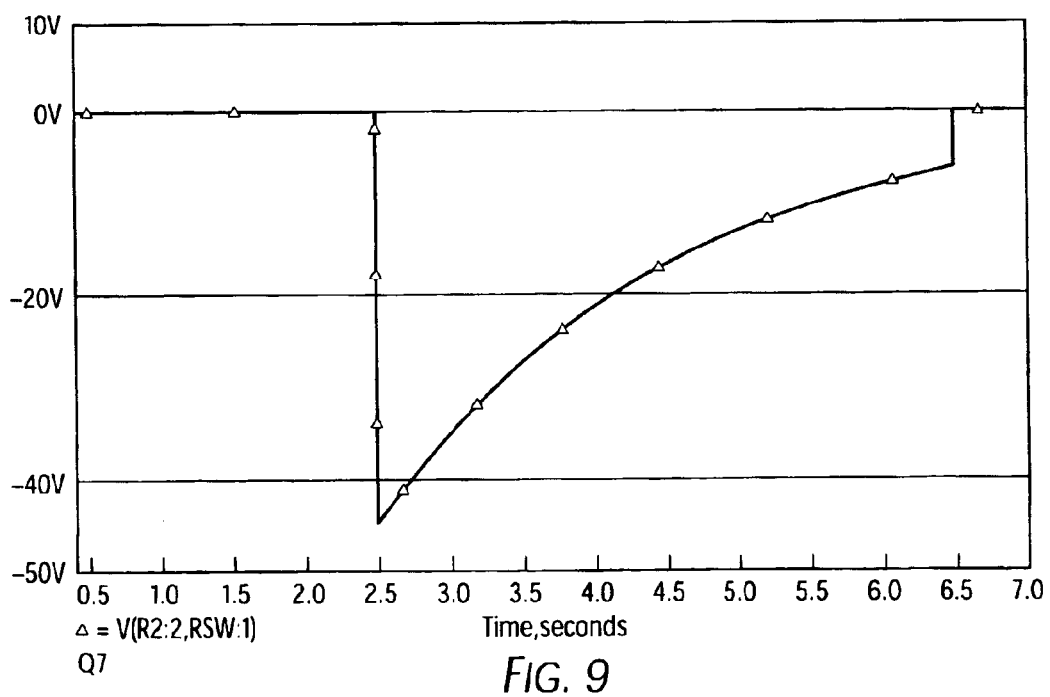
Figure 10:
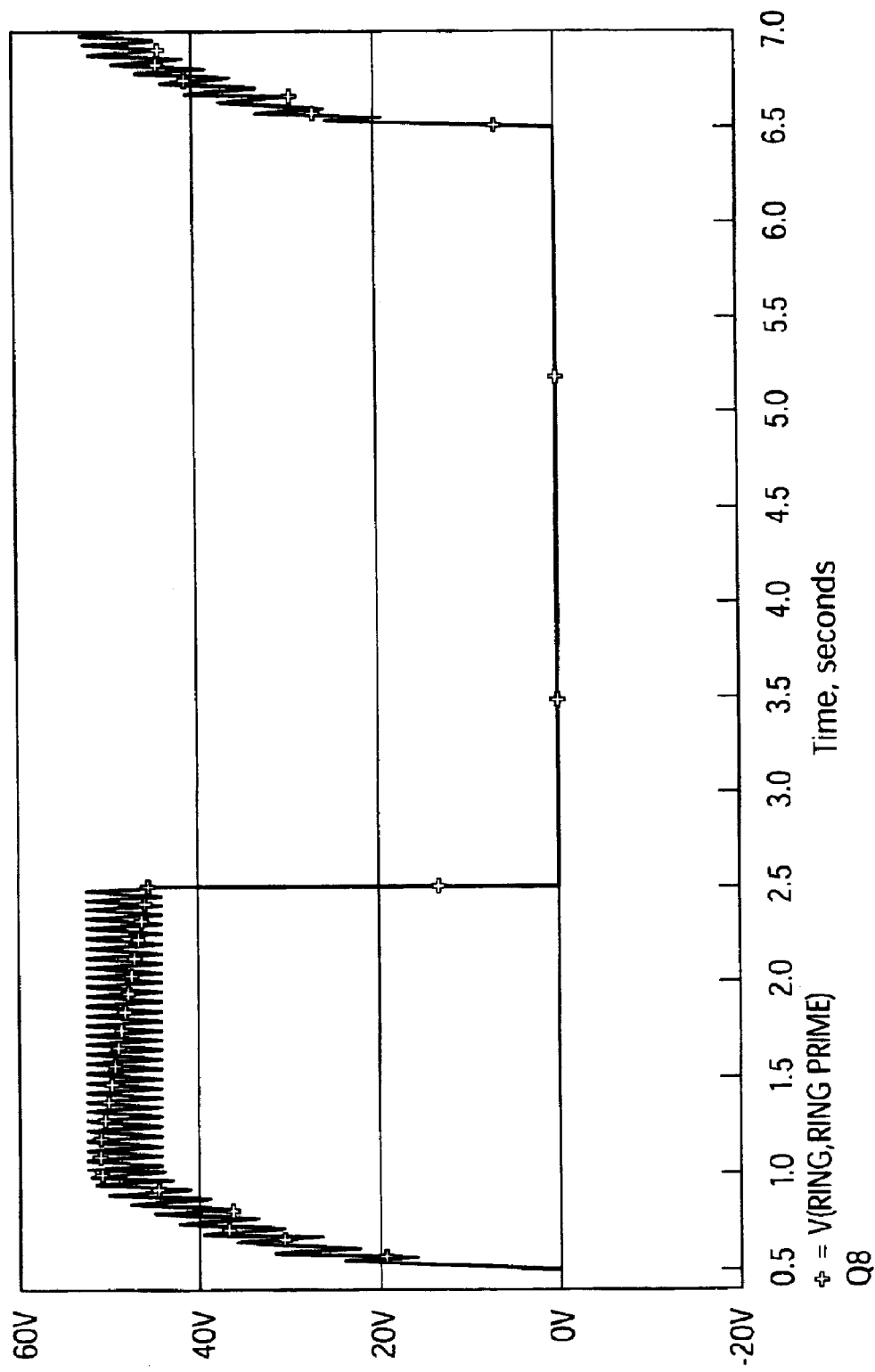

Referring to FIGS. 8, 9 and 10, the voltage across each switch (Q6, Q7, and Q8, respectively) is illustratively shown. FIGS. 8–10 are based on the same time scale.

Figure 11:
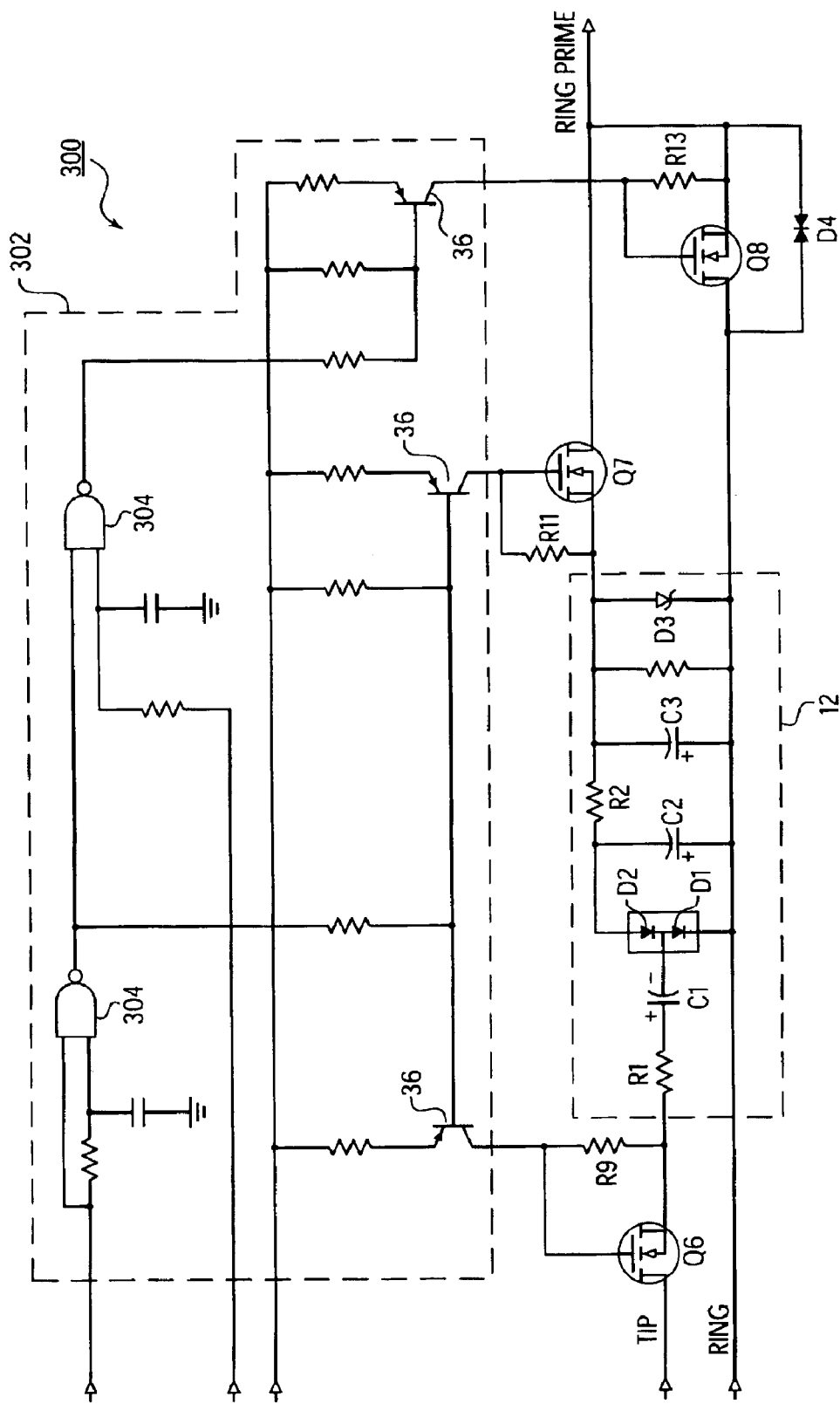
FIG. 11 is a schematic diagram of another ring boost circuit which employs MOSFETs as switches, controlled by current sources which are enabled by digital logic circuits in accordance with another embodiment of the present invention.

Referring to FIG. 11, in another embodiment, circuit 100 of FIG. 7, is simplified by replacing the current mirrors with current sources, which permits two PNP transistors to be eliminated.

Circuit 300 includes logic circuit 302, which includes NAND gates 304. Logic circuit 302 provides timing delay for appropriately switching MOSFETS 06, Q7, and Q8 on and off. D4 is a bidirectional sidactor, which provides protection of MOSFET Q8 during a lightning surge or other transient. D4 is not essential to the ring boost operation, but is illustratively shown in this embodiment as an example of a real-world implementation.

Figure 12:
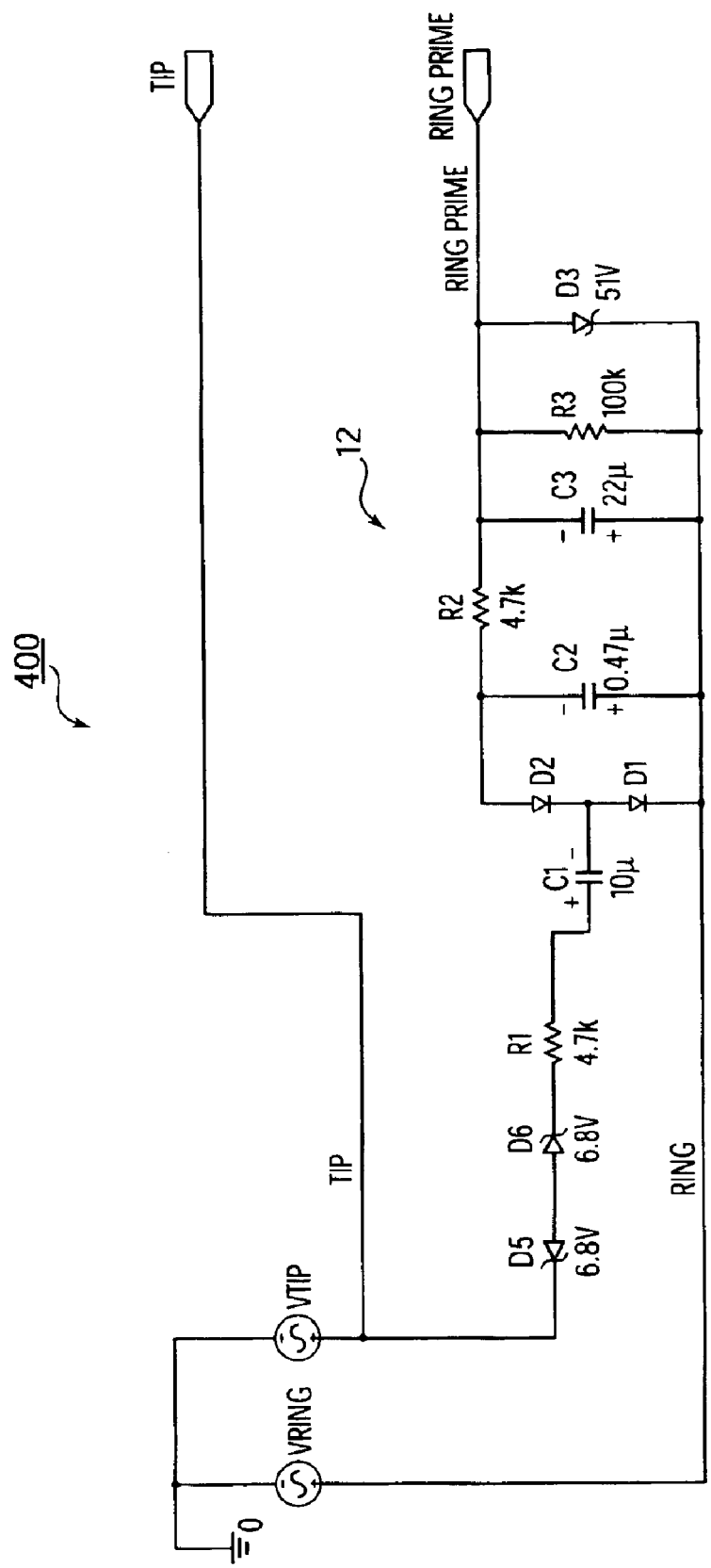
FIG. 12 is a schematic of a simplified ring boost circuit which eliminates the switches altogether in accordance with another embodiment of the present invention.

Referring to FIG. 12, another simpler embodiment is shown in accordance with the present invention indicated generally as circuit 400. Here the switches and their control circuitry have been entirely eliminated. Zener diodes D5 and D6 prevent the charge pump 12 from loading down touch-tone and audio signals during off-hook intervals. These zener diodes provide a different implementation of the function of switch 14 in FIG. 1. RING PRIME is now connected directly to capacitor C3. The operation and functioning of this simplified embodiment is nearly the same as presented previously. The main difference is that the voltage on RING PRIME does not instantly jump to the voltage on RING at the end of the ring period as shown in FIGS. 5 and 6, but instead asymptotically approaches RING as capacitor C3 discharges through resistor R3. Note that replacing switch 14 with zeners D5 and D6 can be done independently of the elimination of switches 18 and 20. This provides various possible combinations of the present invention, all of which embody the spirit of the present invention.

Having described preferred embodiments for ring boost circuit to extend ringing range of telephone SLICs (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A ring boost circuit, comprising:
   a first switching device coupled to a ring node and being responsive to a ring operation; and
   a charge pump connected to the ring node and powered by a ring voltage during the ring operation, the charge pump providing a voltage offset to enhance a differential voltage between the ring node and a tip node when the first switching device is activated during the ring operation.

2. The ring boost circuit as recited in claim 1, wherein the ring operation is initiated by a control signal to activate the first switching device.

3. The ring boost circuit as recited in claim 1, wherein the first switching device includes a normally open switch, which closes during the ring operation and a normally closed switch, which opens during the ring operation.

4. The ring boost circuit as recited in claim 3, wherein a connection to the switch includes a ring output node wherein the normally open switch connects the ring output node to the charge pump during the ring operation such that the offset of the charge pump is added to a potential on the ring node during the ring operation.

5. The ring boost circuit as recited in claim 4, wherein the normally closed switch connects the ring output node to the ring node other than during the ring operation.

6. The ring boost circuit as recited in claim 1, further comprising a second switching device which connects the tip node to the charge pump during the ring operation.

7. The ring boost circuit as recited in claim 1, wherein the charge pump includes a zener diode to limit the offset.

8. The ring boost circuit as recited in claim 1, wherein the charge pump includes a capacitor to provide charge to a ring output node during the ring operation.

9. A ring boost circuit, comprising:
   a tip node and a ring node;
   a first switch coupled to the ring node and being responsive to a ring operation;
   a charge pump connected between the ring node and the first switch and powered by a ring voltage during the ring operation, the charge pump providing a voltage offset to enhance a differential voltage between the ring node and the tip node when the first switch device is closed to connect a ring output node to the charge pump during the ring operation; and
   a second switch, which connects the tip node to the charge pump during the ring operation.

10. The ring boost circuit as recited in claim 9, wherein the ring operation is initiated by a control signal to close the first switch.

11. The ring boost circuit as recited in claim 9, wherein the offset of the charge pump is added to a potential on the ring node during the ring operation.

12. The ring boost circuit as recited in claim 9, wherein the second switch includes a metal oxide semiconductor field effect transistor (MOSFET).

13. The ring boost circuit as recited in claim 9, wherein the charge pump includes a zener diode to limit the offset.

14. The ring boost circuit as recited in claim 9, wherein the charge pump includes a capacitor to provide charge to the ring output node during the ring operation.

15. The ring boost circuit as recited in claim 9, wherein the first switch includes a metal oxide semiconductor field effect transistor (MOSFET).

16. A ring boost circuit, comprising:
   a current preventing device coupled to a tip node to decouple signals other than signals associated with a ring operation; and
   a charge pump connected to a ring node and the current preventing device and powered by a ring voltage during the ring operation, the charge pump providing a voltage offset to enhance a differential voltage between the ring node and the tip node when an activation current is received from the tip node during the ring operation.

17. The ring boost circuit as recited in claim 16, wherein the current preventing device includes a diode.

18. The ring boost circuit as recited in claim 16, further comprising a switching device coupled to the ring node and being responsive to a ring operation to connect the charge pump to the ring output node during the ring operation.

* * * * *